(12) United States Patent
Fang et al.

(10) Patent No.: US 11,513,586 B2
(45) Date of Patent: Nov. 29, 2022

(54) CONTROL DEVICE, METHOD AND EQUIPMENT FOR PROCESSOR

(71) Applicant: SHANGHAI CAMBRICON INFORMATION TECHNOLOGY CO., LTD, Shanghai (CN)

(72) Inventors: Zhou Fang, Shanghai (CN); Bingrui Wang, Shanghai (CN)

(73) Assignee: SHANGHAI CAMBRICON INFORMATION TECHNOLOGY CO., LTD, Shanghai (CN)

( * ) Notice: Subject to any disclaimer, the term of this patent is extended or adjusted under 35 U.S.C. 154(b) by 0 days.

(21) Appl. No.: 16/615,293

(22) PCT Filed: Jan. 9, 2019

(86) PCT No.: PCT/CN2019/070923
§ 371 (c)(1),
(2) Date: Nov. 20, 2019

(87) PCT Pub. No.: WO2019/157888
PCT Pub. Date: Aug. 22, 2019

(65) Prior Publication Data
US 2020/0174547 A1 Jun. 4, 2020

(30) Foreign Application Priority Data

Feb. 14, 2018 (CN) .......................... 201810151580.2

(51) Int. Cl.
*G06F 1/3287* (2019.01)
*G06F 1/324* (2019.01)
(Continued)

(52) U.S. Cl.
CPC ............ *G06F 1/3287* (2013.01); *G06F 1/324* (2013.01); *G06F 1/3206* (2013.01);
(Continued)

(58) Field of Classification Search
CPC ...... G06F 1/3203; G06F 1/3206; G06F 1/324; G06F 1/3243; G06F 1/3287; G06F 1/3296; G06F 1/3293; G06N 3/02; G06N 20/00
See application file for complete search history.

(56) References Cited

U.S. PATENT DOCUMENTS

| 5,052,043 A | 9/1991 | Gaborski |
| 6,144,977 A | 11/2000 | Giangarra et al. |

(Continued)

FOREIGN PATENT DOCUMENTS

| CN | 1503858 A | 6/2004 |
| CN | 1503958 A | 6/2004 |

(Continued)

OTHER PUBLICATIONS

Ge, Yang. Dynamic Thermal Management for Microprocessors. 2012. Syracuse University. Electrical Engineering and Computer Science—Dissertations. 326. (Year: 2012).*

(Continued)

*Primary Examiner* — Thomas J. Cleary
(74) *Attorney, Agent, or Firm* — Rimon PC

(57) ABSTRACT

Disclosed in the present application are a control device, method and equipment for a processor. The control device for the processor comprises: an arithmetic circuit and a memory, the arithmetic circuit being connected to the memory. The arithmetic circuit is used to output a control signal according to acquired sensor data, and the control signal is used to control a processor. The control device, method and equipment for the processor according to the present invention may be used to determine whether it is necessary to start the processor according to preset key information, or whether it is necessary to reduce the energy (Continued)

consumption of a processor which is currently in operation, thereby improving endurance.

20 Claims, 4 Drawing Sheets

(51) Int. Cl.
    *G06F 1/3296*     (2019.01)
    *G06F 1/3206*     (2019.01)
    *G06N 3/02*     (2006.01)
    *G06F 1/3234*     (2019.01)

(52) U.S. Cl.
    CPC .......... *G06F 1/3243* (2013.01); *G06F 1/3296* (2013.01); *G06N 3/02* (2013.01)

(56) References Cited

U.S. PATENT DOCUMENTS

| | | | |
|---|---|---|---|
| 6,671,796 | B1 | 12/2003 | Sudharsanan et al. |
| 6,715,065 | B1 | 3/2004 | Ebata et al. |
| 6,931,639 | B1 | 8/2005 | Eickemeyer |
| 7,236,995 | B2 | 6/2007 | Hinds |
| 7,242,414 | B1 | 7/2007 | Thekkath et al. |
| 7,406,451 | B2 | 7/2008 | Mrziglod et al. |
| 7,721,128 | B2* | 5/2010 | Johns .................... G01K 3/005 713/322 |
| 7,945,607 | B2 | 5/2011 | Hinds |
| 8,051,117 | B2 | 11/2011 | Lundvall et al. |
| 8,190,664 | B2 | 5/2012 | Lundvall et al. |
| 8,560,591 | B2 | 10/2013 | Lundvall et al. |
| 8,694,572 | B2 | 4/2014 | Samy et al. |
| 8,762,438 | B2 | 6/2014 | Lundvall et al. |
| 8,924,455 | B1 | 12/2014 | Barman et al. |
| 9,052,896 | B2* | 6/2015 | Schillings ............... G06N 7/005 |
| 9,412,366 | B2 | 8/2016 | Wilensky et al. |
| 9,916,531 | B1 | 3/2018 | Zivkovic et al. |
| 10,187,568 | B1 | 1/2019 | Tran et al. |
| 10,224,954 | B1 | 3/2019 | Madduri et al. |
| 10,360,304 | B1 | 7/2019 | Alvarez et al. |
| 10,427,306 | B1 | 10/2019 | Quinlan et al. |
| 10,656,942 | B2 | 5/2020 | Madduri et al. |
| 10,929,744 | B2 | 2/2021 | Li et al. |
| 2002/0138714 | A1 | 9/2002 | Leibholz et al. |
| 2003/0167460 | A1 | 9/2003 | Desai et al. |
| 2005/0138327 | A1 | 6/2005 | Tabei |
| 2006/0161375 | A1* | 7/2006 | Duberstein ............. G06F 1/206 702/132 |
| 2007/0220076 | A1 | 9/2007 | Hinds |
| 2008/0148120 | A1 | 6/2008 | Seuring |
| 2009/0113186 | A1 | 4/2009 | Kato et al. |
| 2009/0125293 | A1* | 5/2009 | Lefurgy .............. G06F 11/3476 703/18 |
| 2010/0073068 | A1* | 3/2010 | Cho ........................ G06F 1/206 327/513 |
| 2011/0060587 | A1 | 3/2011 | Phillips et al. |
| 2011/0301777 | A1* | 12/2011 | Cox ...................... G06F 1/3203 700/299 |
| 2012/0316845 | A1 | 12/2012 | Grey et al. |
| 2013/0054110 | A1* | 2/2013 | Sata .................... F02D 41/1401 701/102 |
| 2013/0332610 | A1 | 12/2013 | Beveridge |
| 2014/0081625 | A1 | 3/2014 | Wilensky et al. |
| 2014/0164737 | A1 | 6/2014 | Collange et al. |
| 2014/0249814 | A1 | 9/2014 | Nakano et al. |
| 2015/0134581 | A1 | 5/2015 | Doeding et al. |
| 2015/0370303 | A1* | 12/2015 | Krishnaswamy ....... G06F 1/324 713/322 |
| 2016/0026231 | A1* | 1/2016 | Ignowski .............. G06F 1/3275 713/320 |
| 2016/0054922 | A1 | 2/2016 | Awasthi et al. |
| 2016/0124710 | A1 | 5/2016 | Lutz et al. |
| 2016/0170866 | A1 | 6/2016 | Ioualalen et al. |
| 2016/0328645 | A1 | 11/2016 | Lin et al. |
| 2016/0328647 | A1 | 11/2016 | Lin et al. |
| 2017/0061279 | A1 | 3/2017 | Yang et al. |
| 2017/0090956 | A1 | 3/2017 | Linsky |
| 2017/0103022 | A1 | 4/2017 | Kreinin et al. |
| 2017/0142327 | A1 | 5/2017 | Bayani |
| 2017/0161604 | A1 | 6/2017 | Craddock et al. |
| 2017/0221176 | A1 | 8/2017 | Munteanu et al. |
| 2017/0257079 | A1* | 9/2017 | Jain ........................ G06F 1/3296 |
| 2017/0262959 | A1 | 9/2017 | Lee et al. |
| 2017/0316307 | A1 | 11/2017 | Koster et al. |
| 2017/0316312 | A1 | 11/2017 | Goyal et al. |
| 2017/0344882 | A1 | 11/2017 | Ambrose et al. |
| 2017/0353163 | A1* | 12/2017 | Gazneli ................... H03F 1/3247 |
| 2017/0357530 | A1 | 12/2017 | Shih et al. |
| 2017/0357910 | A1 | 12/2017 | Sommer et al. |
| 2018/0046903 | A1 | 2/2018 | Yao et al. |
| 2018/0088996 | A1 | 3/2018 | Rossi et al. |
| 2018/0096243 | A1* | 4/2018 | Patil ...................... G06N 3/0454 |
| 2018/0157464 | A1 | 6/2018 | Lutz et al. |
| 2018/0288440 | A1* | 10/2018 | Chao ..................... H04N 19/156 |
| 2018/0293517 | A1 | 10/2018 | Browne et al. |
| 2018/0300931 | A1 | 10/2018 | Vembu et al. |
| 2018/0322391 | A1 | 11/2018 | Wu et al. |
| 2018/0357541 | A1 | 12/2018 | Chen et al. |
| 2018/0367729 | A1 | 12/2018 | Parasnis et al. |
| 2018/0373976 | A1 | 12/2018 | Woo |
| 2019/0034784 | A1 | 1/2019 | Li et al. |
| 2019/0042925 | A1 | 2/2019 | Choe et al. |
| 2019/0050710 | A1 | 2/2019 | Wang et al. |
| 2019/0057696 | A1 | 2/2019 | Ogawa |
| 2019/0065208 | A1* | 2/2019 | Liu ........................ G06F 9/3822 |
| 2019/0114142 | A1 | 4/2019 | Yoda et al. |
| 2019/0122094 | A1 | 4/2019 | Chen et al. |
| 2019/0122119 | A1 | 4/2019 | Husain |
| 2019/0138372 | A1 | 5/2019 | Tee |
| 2019/0164285 | A1 | 5/2019 | Nye et al. |
| 2019/0180170 | A1 | 6/2019 | Huang et al. |
| 2019/0199370 | A1 | 6/2019 | Madduri et al. |
| 2019/0205073 | A1 | 7/2019 | Bleiweiss et al. |
| 2019/0205746 | A1 | 7/2019 | Nurvitadhi et al. |
| 2019/0220734 | A1 | 7/2019 | Ferdman et al. |
| 2019/0228762 | A1 | 7/2019 | Wang et al. |
| 2019/0250691 | A1* | 8/2019 | Lee ........................... G06N 3/08 |
| 2019/0251429 | A1 | 8/2019 | Du et al. |
| 2019/0265949 | A1 | 8/2019 | Ito |
| 2019/0278677 | A1 | 9/2019 | Terechko et al. |
| 2019/0294968 | A1 | 9/2019 | Vantrease et al. |
| 2020/0005424 | A1 | 1/2020 | Appu et al. |
| 2020/0097799 | A1* | 3/2020 | Divakar .................. G06F 7/487 |
| 2020/0117453 | A1 | 4/2020 | Zhang et al. |
| 2020/0117614 | A1 | 4/2020 | Zhang et al. |
| 2020/0125508 | A1 | 4/2020 | Liu et al. |
| 2020/0126554 | A1 | 4/2020 | Chen et al. |
| 2020/0142748 | A1 | 5/2020 | Liu et al. |
| 2020/0159527 | A1 | 5/2020 | Zhang et al. |
| 2020/0159530 | A1 | 5/2020 | Zhang et al. |
| 2020/0159531 | A1 | 5/2020 | Zhang et al. |
| 2020/0159532 | A1 | 5/2020 | Zhang et al. |
| 2020/0159533 | A1 | 5/2020 | Zhang et al. |
| 2020/0159534 | A1 | 5/2020 | Li et al. |
| 2020/0160162 | A1 | 5/2020 | Zhang et al. |
| 2020/0160163 | A1 | 5/2020 | Liu et al. |
| 2020/0160219 | A1 | 5/2020 | Zhang et al. |
| 2020/0160220 | A1 | 5/2020 | Zhang et al. |
| 2020/0160221 | A1 | 5/2020 | Zhang et al. |
| 2020/0160222 | A1 | 5/2020 | Zhang et al. |
| 2020/0168227 | A1 | 5/2020 | Chen et al. |
| 2020/0183752 | A1 | 6/2020 | Liu et al. |
| 2020/0241874 | A1 | 7/2020 | Chen et al. |
| 2020/0257972 | A1 | 8/2020 | Miniskar et al. |
| 2020/0334041 | A1 | 10/2020 | Zhang et al. |
| 2020/0334522 | A1 | 10/2020 | Zhang et al. |
| 2020/0334572 | A1 | 10/2020 | Zhang et al. |
| 2020/0394522 | A1 | 12/2020 | Liu et al. |
| 2020/0394523 | A1 | 12/2020 | Liu et al. |
| 2021/0042889 | A1* | 2/2021 | Pei ........................... G06N 3/08 |
| 2021/0061028 | A1* | 3/2021 | Da Deppo ............ G06N 20/00 |
| 2021/0117768 | A1 | 4/2021 | Liu et al. |
| 2021/0117810 | A1 | 4/2021 | Liu |

(56) References Cited

U.S. PATENT DOCUMENTS

| | | |
|---|---|---|
| 2021/0182177 A1 | 6/2021 | Su et al. |
| 2021/0264270 A1 | 8/2021 | Liu et al. |
| 2021/0286688 A1 | 9/2021 | Liu et al. |
| 2021/0334007 A1 | 10/2021 | Liu et al. |
| 2021/0334137 A1 | 10/2021 | Zhang et al. |
| 2021/0341989 A1 | 11/2021 | Chen et al. |
| 2021/0374510 A1 | 12/2021 | Liu et al. |
| 2021/0374511 A1 | 12/2021 | Liu et al. |

FOREIGN PATENT DOCUMENTS

| | | |
|---|---|---|
| CN | 1851668 A | 10/2006 |
| CN | 101572829 A | 11/2009 |
| CN | 102270042 A | 12/2011 |
| CN | 102404673 A | 4/2012 |
| CN | 102684701 A | 9/2012 |
| CN | 102761509 A | 10/2012 |
| CN | 102789413 A | 11/2012 |
| CN | 102903089 A | 1/2013 |
| CN | 102981854 A | 3/2013 |
| CN | 103152673 A | 6/2013 |
| CN | 104914977 A | 9/2015 |
| CN | 105389158 A | 3/2016 |
| CN | 103534664 A | 8/2016 |
| CN | 105893419 A | 8/2016 |
| CN | 105978611 A | 9/2016 |
| CN | 106156310 A | 11/2016 |
| CN | 106354568 A | 1/2017 |
| CN | 106406812 A | 2/2017 |
| CN | 106469291 A | 3/2017 |
| CN | 106485316 A | 3/2017 |
| CN | 106502626 A | 3/2017 |
| CN | 106570559 A | 4/2017 |
| CN | 106650922 A | 5/2017 |
| CN | 106814639 A1 | 6/2017 |
| CN | 106951587 A | 7/2017 |
| CN | 106951962 A1 | 7/2017 |
| CN | 106997236 A | 8/2017 |
| CN | 107003988 A | 8/2017 |
| CN | 107025629 A | 8/2017 |
| CN | 107368174 A | 11/2017 |
| CN | 107451654 A | 12/2017 |
| CN | 107451658 A | 12/2017 |
| CN | 107608715 A | 1/2018 |
| CN | 107644254 A | 1/2018 |
| CN | 107688855 A | 2/2018 |
| CN | 107797913 A | 3/2018 |
| CN | 108053028 A | 5/2018 |
| CN | 104899641 A | 7/2018 |
| CN | 108337000 A | 7/2018 |
| CN | 108510067 A | 9/2018 |
| CN | 108717570 A | 10/2018 |
| CN | 109062540 A | 12/2018 |
| CN | 109063820 A | 12/2018 |
| CN | 109146057 A | 1/2019 |
| CN | 109214509 A | 1/2019 |
| CN | 109389219 A | 2/2019 |
| CN | 109472353 A | 3/2019 |
| CN | 109800877 A | 5/2019 |
| CN | 109902745 A | 6/2019 |
| CN | 109934331 A | 6/2019 |
| CN | 109993296 A | 7/2019 |
| CN | 110059733 A | 7/2019 |
| CN | 11055450 A | 12/2019 |
| CN | 110780845 A | 2/2020 |
| EP | 0 789 296 A1 | 8/1997 |
| EP | 2703945 A2 | 3/2014 |
| EP | 3106997 A2 | 12/2016 |
| EP | 3 407 268 A1 | 11/2018 |
| JP | H03-075860 A | 8/1989 |
| JP | H09-265379 A | 10/1997 |
| JP | 2009-134433 A | 8/2012 |
| JP | 2013-514570 A | 4/2013 |
| JP | 2014-199464 A | 10/2014 |
| JP | 2015176158 A | 10/2015 |
| JP | 2018-26114 A | 2/2018 |
| JP | 2019-519852 A | 7/2019 |
| WO | 2008153194 A1 | 12/2008 |
| WO | 2016186823 A1 | 11/2016 |
| WO | 2017185412 A1 | 11/2017 |

OTHER PUBLICATIONS

Moghaddam, Milad Ghorbani. "Dynamic Energy and Reliability Management in Network-on-Chip based Chip Multiprocessors". 2017. IEEE. (Year: 2017).*

Chen, T., et al., "DianNao: A Small-Footprint High-Throughput Accelerator for Ubiquitous Machine-Learning," ASPLOS '14 Proceedings of the 19th international conference on Architectural support for programming languages and operating systems, pp. 269-284, Salt Lake City, Utah, USA—Mar. 1, 2014; available: https://dl.acm.org/citation.cfm?id=2541967.

Chen, T., et al., "A Small-Footprint Accelerator for Large-Scale Neural Networks," ACM Transactions on Computer Systems (TOCS), vol. 33, Issue 2, May 1, 2015, Article No. 6, ACM New York, NY, USA; available: https://dl.acm.org/citation.cfm?id=2701417.

Chen, Y., et al., "DaDianNao: A Machine-Learning Supercomputer," MICRO-47 Proceedings of the 47th Annual IEEE/ACM International Symposium on Microarchitecture, pp. 609-622, Cambridge, United Kingdom—Dec. 13, 2014; available: https://dl.acm.org/citation.cfm?id=2742217.

Luo, T., et al., "DaDianNao: A Neural Network Supercomputer," Published in: IEEE Transactions on Computers, vol. 66, Issue: 1, pp. 73-88, Date of Publication: May 30, 2016; available: https://ieeexplore.ieee.org/document/7480791.

Liu, D., et al., "PuDianNao: A Polyvalent Machine Learning Accelerator," ASPLOS '15 Proceedings of the Twentieth International Conference on Architectural Support for Programming Languages and Operating Systems,pp. 369-381, Istanbul, Turkey—Mar. 14, 2015; available: https://dl.acm.org/citation.cfm?id=2694358.

Du, Z., et al., "ShiDianNao: Shifting Vision Processing Closer to the Sensor," ISCA '15 Proceedings of the 42nd Annual International Symposium on Computer Architecture, pp. 92-104, Portland, Oregon—Jun. 13, 2015; available: https://dl.acm.org/citation.cfm?id=2750389.

Du, Z., et al., "An Accelerator for High Efficient Vision Processing," Published in: IEEE Transactions on Computer-Aided Design of Integrated Circuits and Systems, vol. 36, Issue: 2, Jun. 22, 2016, pp. 227-240; available: https://ieeexplore.ieee.org/document/7497562.

Liu, S., et al., "Cambricon: An Instruction Set Architecture for Neural Networks," 2016 ACM/IEEE 43rd Annual International Symposium on Computer Architecture (ISCA), Seoul, South Korea, Jun. 18, 2016; available: https://ieeexplore.ieee.org/document/7551409.

Zhang, S. et al., "Cambricon-X: An Accelerator for Sparse Neural Networks," Published in: 2016 49th Annual IEEE/ACM International Symposium on Microarchitecture (MICRO), Taipei, Taiwan, Oct. 15, 2016; available: https://ieeexplore.ieee.org/document/7783723.

Chen, Y., et al., "DianNao Family: Energy-Efficient Hardware Accelerators for Machine Learning," Communications of the ACM, vol. 59 Issue 11, Oct. 28, 2016, pp. 105-112, ACM New York, NY, USA; available: https://dl.acm.org/citation.cfm?id=2996864.

Vivienne Sze et al., "Efficient Processing of Deep Neural Networks: A Tutorial and Survey", arxiv.org, Cornell University Library, 201 Olin Library Cornell University Ithaca, NY 14853, Mar. 27, 2017 (Mar. 27, 2017), XP080759895, DOI: 10.1109/JPROC.2017.2761740.

IBM, "PowerPC Microprocessor Family: Vector/SIMD Multimedia Extension Technology Programming Environments Manual Programming Environments Manual", Aug. 22, 2005 (Aug. 22, 2005), pp. 170-171, XP055673033, Retrieved from the Internet: URL:http://math-atlas.sourceforge.net/devel/assembly/ vector_simd_pem. ppc. 2005AUG23.pdf [retrieved on Mar. 3, 2020].

Sumod Mohan, "Accuracy and Multi-Core Performance of Machine Learning Algorithms for Handwritten Character Recognition", Aug. 1, 2009 (Aug. 1, 2009), XP055673941, Retrieved from the Internet:

(56) References Cited

OTHER PUBLICATIONS

URL:https://tigerprints.clemson.edu/cgi/viewcontent.cgi? article=1634&context=all theses retrieved on Mar. 5, 2020].
European Patent Office, Extended European Search Report for European Application No. 19212749.6 dated Mar. 18, 2020.
European Patent Office, Extended European Search Report for European Application No. 19212750.4 dated Mar. 18, 2020.
European Patent Office, Extended European Search Report for European Application No. 19212751.2 dated Mar. 18, 2020.
European Patent Office, Extended European Search Report for European Application No. 19212752.0 dated Mar. 18, 2020.
European Patent Office, Extended European Search Report for European Application No. 19214004.4 dated Mar. 18, 2020.
European Patent Office, Extended European Search Report for European Application No. 19213389.0 dated Mar. 18, 2020.
European Patent Office, Extended European Search Report for European Application No. 19212753.8 dated Mar. 18, 2020.
European Patent Office, Extended European Search Report for European Application No. 19212754.6 dated Mar. 18, 2020.
European Patent Office, Extended European Search Report for European Application No. 19212755.3 dated Mar. 18, 2020.
European Patent Office, Extended European Search Report for European Application No. 19212756.1 dated Mar. 18, 2020.
European Patent Office, Extended European Search Report for European Application No. 18906652.6 dated Mar. 18, 2020.
European Patent Office, Extended European Search Report for European Application No. 19212746.2 dated Mar. 18, 2020.
Li et al., "Using Artificial Neural Network for Predicting Thread Partitioning in Speculative Multithreading", IEEE, 2015, pp. 823-826.
Na et al., "Speeding up Convolutional Neural Network Training with Dynamic Precision Scaling and Flexible MultiplierAccumulator", Section 2 Proposed Approach: Concept, ACM, Aug. 8-10, 2016, 6 pages.
Hanlon, Jamie, "Why is so much memory needed for deep neural networks?", URL: https://www.graphcore.ai/posts/why-is-so-much-memory-needed-for-deep-neural-networks, Jan. 31, 2017, 6 pages.
Anonymous, "Control unit—Wikipedia", May 8, 2017 (May 8, 2017), XP055673879,Retrieved from the Internet: URL:https://web.archive.org/web/20170508110348/https://en.wikipedia.org/ wiki/Control unit [retrieved on Mar. 5, 2020].
Joel Emer et al., "DNN Accelerator Architectures", CICS/MTL Tutorial, Jan. 1, 2017 (Jan. 1, 2017), XP055672691, Retrieved from the Internet: URL:https://www.rle.mit.edu/eems/wp-content/uploads/2017/031Tutorial-on- JNN-4-of-5-DNN-Accelerator-Architectures.pdf [retrieved on Mar. 2, 2020].
Chen Yu-Hsin et al., "Eyeriss: An Energy-Efficient Reconfigurable Accelerator for Deep Convolutional Neural getworks", IEEE Journal of Solid-State Circuits, IEEE, USA, vol. 52, No. 1, Jan. 1, 2017 (Jan. 1, 2017), pp. 127-138, XP011638633, ISSN: 0018-9200, DOI: 10.1109/JSSC.2016.2616357 [retrieved on Jan. 9, 2017].
European Patent Office, Extended European Search Report for European Application No. 19218382.0 dated Apr. 24, 2020.
Yi Yang et al., "Deploy Large-Scale Deep Neural Networks in Resource Constrained Io T Devices with Local Quantization Region", arxiv.org, Cornell University Library, 201 Olin Library Cornell University Ithaca, NY 14853, May 24, 2018 (May 24, 2018), XP081234517.
Hsu Jeremy, "For sale: deep learning [News]", IEEE Spectrum, IEEE Inc. New York, US, vol. 53, No. 8, Aug. 1, 2016 (Aug. 1, 2016), pp. 12-13, XP011620787, ISSN: 0018-9235, DOI: 10.1109/MSPEC.2016.7524158 [retrieved on Jul. 27, 2016].
Song Mingcong et al., "In-Situ AI: Towards Autonomous and Incremental Deep Learning for IoT Systems", 2018 IEEE International Symposium on High Performance Computer Architecture (HPCA),IEEE, Feb. 24, 2018 (Feb. 24, 2018), pp. 92-103, XP033341941, DOI: 10.1109/HPCA.2018.00018 [retrieved on Mar. 27, 2018].
Kallam Suresh et al., "Evaluating the Performance of Deep Learning Techniques on Classification Using Tensor Flow Application", 2018 International Conference on Advances in Computing and Communication Engineering (ICACCE). IEEE, Jun. 22, 2018 (Jun. 22, 2018), pp. 331-335, XP033389370, DOI: 10.1109/ICACCE.2018.844167 4 [retrieved on Aug. 20, 2018].
Olariu Cristian et al., "A Cloud-Based AI Framework for Machine Learning Orchestration: A "Driving or Not-Driving" Case-Study for Self-Driving Cars", 2019 IEEE Intelligent Vehicles Symposium (IV). IEEE, Jun. 9, 2019 (Jun. 9, 2019), pp. 1715-1722, XP033606002, DOI: 10.1109/IVS.2019.8813870 [retrieved on Aug. 26, 2019].
European Patent Office, extended European search report for Application No. 19216754.2 dated May 8, 2020.
Extended European Search Report for EP Application No. 19214324.6 dated Oct. 1, 2020.
International Searching Authority, International Search Report for PCT Application No. PCT/CN2019/093144 dated Oct. 9, 2019.
Sumina Yamashita, et al., "A Method to create illustrate images using DCGAN," JISJ SIG Technical Report, vol. 2017-MPS-112 No. 16, Feb. 27, 2017; translation of abstract included.

* cited by examiner

CONTROL DEVICE, METHOD AND EQUIPMENT FOR PROCESSOR

RELATED APPLICATIONS

This application is a national stage application of PCT/CN2019/070923, filed Jan. 9, 2019, which claims the benefit of priority from Chinese Application No. 201810151580.2, filed Feb. 14, 2018, the disclosures of which are incorporated herein by reference in their entirety.

TECHNICAL FIELD

The present disclosure relates to the field of computer technology, and in particular relates to a control device, a method, and equipment for processor.

BACKGROUND

With the development of computer technology, more and more equipment has integrated with processors. At the same time, in many application environments, people have given more attention to the feature of low energy consumption and long standby of equipment. The processor is the computation core and control core of the equipment, which has heavy power consumption.

For traditional equipment, as long as the equipment is in operation, the integrated processor is also turned on, which may lead to the situation that the power consumption of the entire equipment is increased and the battery life is reduced. For instance, in the field of intelligent robot, if the main processor of an intelligent robot is always in operation, the battery life of the robot may be greatly affected. Similarly, in the field of smart phone, if the main processor of a smart phone is always in operation, the battery life of the smart phone may be greatly affected too.

SUMMARY

In view of the situation, it is necessary to provide a control device, a method, and equipment for processor to overcome a problem that the processor in the traditional equipment consumes a very large amount of energy.

The present disclosure provides a processor control device, where the processor control device may include a computational circuit and a memory. The computational circuit may be connected to the memory, and may be configured to output a control signal according to obtained sensor data, where the control signal is for controlling a processor.

In an example, the memory may include a volatile memory and a nonvolatile memory, where the volatile memory may be configured to cache intermediate data, and the nonvolatile memory may be configured to store a computational model.

In an example, the computational model may include a first computational model and a second computational model, where the capacity of the first computational model may be less than that of the second computational model;

the nonvolatile memory may include a large capacity model memory and a low capacity model memory, where the large capacity model memory may be configured to store the second computational model, the low capacity model memory may be configured to store the first computational model, and the memory capacity of the large capacity model memory may be larger than that of the low capacity model memory.

In an example, the computational circuit may include a primary processing circuit, a basic processing circuit, and a branch processing circuit, where the primary processing circuit may be connected to the branch processing circuit, and the branch processing circuit may be connected to at least one basic processing circuit.

In an example, the primary processing circuit may include a control circuit, a vector computing unit circuit, an ALU (Arithmetic and Logic Unit) circuit, an accumulator circuit, and a direct memory access circuit.

In an example, the computational circuit may include a neural network processing unit that may be configured to perform a neural network operation.

In an example, the processor control device may include a sensor control unit, where the sensor control unit may be connected to the computational circuit and may be configured to control the signal transmission between the processor control device and a sensor.

In an example, the sensor control unit may include at least one sensor interface, where the sensor interface may be configured to connect the sensor and may be connected to the computational circuit.

In an example, the sensor control unit may include a controller and a caching unit (cache, buffer, or scratch pad), where the controller and the caching unit may be communicatively connected, where the controller may be configured to control the sensor, and the caching unit may be configured to cache a sensor signal sent by the sensor.

In an example, the sensor control unit may include a configuration memory that may be connected to the controller, where the configuration memory may be configured to store interactive information input by users.

In an example, the control signal may be an on/off signal for turning on or turning off the processor.

In an example, the processor control device may include a power controller that may be connected to the computational circuit, where the power controller may be configured to turn on or turn off the processor according to the on/off signal.

In an example, the power controller may include an on/off controller and a power interface, where a terminal of the on/off controller may be connected to the computational circuit in series, and another terminal of the on/off controller may be connected to the power interface in series.

In an example, the control signal may be a power saving signal which may include at least one of a frequency reduction signal, a voltage reduction signal, and a shutdown signal for some units.

An example of the present disclosure provides a chip which may include the processor control device of any of the examples above.

An example of the present disclosure provides a chip package structure which may include the chip of the example above.

An example of the present disclosure provides a board card which may include the chip package structure of the example above.

An example of the present disclosure provides an electronic device which may include the board card of the example above.

An example of the present disclosure provides electronic equipment which may include a sensor, a processor, and the processor control device of any of the examples above.

The processor control device may be connected to the processor, and the sensor may be connected to the processor and/or the processor control device, where the power consumption per unit time of the processor control device may be less than that of the processor.

The present disclosure provides a processor control method, where the method may include:

obtaining sensor data; and determining whether the sensor data match preset key information;

if the sensor data match the preset key information, outputting a control instruction, where the control instruction is for controlling the processor.

In an example, if the sensor data do not match the preset key information, the method may further include:

continuing the step of obtaining sensor data.

In an example, prior to the determining whether the sensor data match the preset key information, the method may further include:

determining whether the sensor data satisfy a preset condition; and if the sensor data satisfy the preset condition, continuing the step of determining whether the sensor data match the preset key information.

In an example, the determining whether the sensor data satisfy the preset condition may include:

collecting the sensor data at every preset time interval.

In an example, the determining whether the sensor data satisfy the preset condition may include:

obtaining the sensor data of a current time and caching the sensor data of a previous time;

determining whether the sensor data of the current time match the sensor data of the previous time; and if the sensor data of the current time is different from the sensor data of the previous time, determining the sensor data satisfy the preset condition.

In an example, if the sensor data do not satisfy the preset condition, the method may further include:

continuing the step of obtaining sensor data.

In an example, the determining whether the sensor data match the preset key information may include:

according to the sensor data, performing a computation based on a preset computational model to obtain an output result;

if the output result is greater than a preset first threshold, determining that the sensor data match the preset key information; and if the output result is less than or equal to the preset first threshold, determining that the sensor data do not match the preset key information.

In an example, the computational model may be obtained through convolutional neural network training.

In an example, the computational model may include a first computational model and a second computational model, where the capacity of the first computational model may be greater than that of the second computational model.

In this case, the according to the sensor data, performing a computation based on the preset computational model to obtain an output result may include:

obtaining the first computational model, and according to the sensor data, performing a computation based on the first computational model to obtain a first intermediate result;

determining whether the first intermediate result is greater than a second threshold; and if the first intermediate result is greater than the second threshold, obtaining the second computational model, and according to the sensor data, performing a computation based on the second computational model to obtain an output result.

In an example of the present disclosure, the control method may include:

if the first intermediate result is not greater than the second threshold, performing the step of obtaining sensor data.

In an example, the control instruction may include a turning on instruction for turning on the processor.

In an example, the control instruction may include a power saving instruction which may include at least one of a frequency reduction instruction, a voltage reduction instruction, and a shutdown instruction for some units.

The control device, the method, and the equipment for processor provided by the above-mentioned examples can determine whether to turn on the processor, or whether to reduce the energy consumption when the processor is in operation according to the preset key information. In other words, the processor may be turned on and be in operation only when the sensor data match the preset key information. Or when the processor is in operation, the energy consumption of the processor can be reduced by decreasing frequency, decreasing voltage, or turning off some units, which can improve the battery life.

BRIEF DESCRIPTION OF THE DRAWINGS

In order to illustrate the examples of the present disclosure or the technical solutions in the prior art more clearly, the drawings to be used in the description of the examples or the prior art will be briefly explained below. Obviously, the drawings in the description below are only examples of the present disclosure. Other drawings can be obtained according to the disclosed drawings without any creative effort by those skilled in the art.

DETAILED DESCRIPTION

Figure 1:
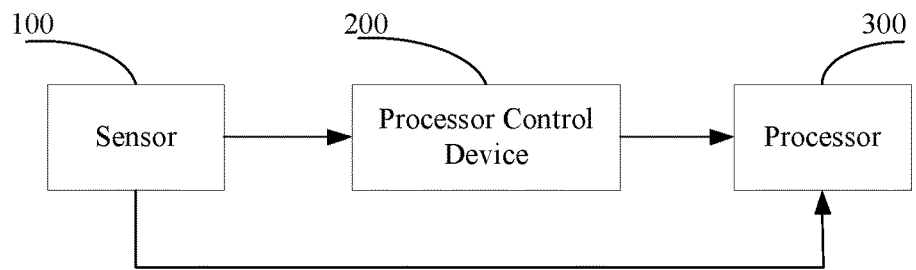
FIG. 1 is a diagram showing an application scenario of a processor control device according to an example.

In order to make the technical schemes of the present disclosure clearer, a processor control device, method, and equipment of the present disclosure will be described hereinafter with reference to the accompanied drawings. It should be understood that the examples described herein are merely used for explaining the present disclosure, rather than limiting the present disclosure. Note that, as long as there is no contradiction, the examples of the present disclosure and features of the examples can be combined with each other. It should be understood that the terms such as "first", "second", and the like in the examples of the present disclosure are used for distinguishing between different objects rather than describing any particular order or technical meaning. FIG. 1 is a diagram showing an application scenario of a processor control device according to an example. The processor control device may include a sensor 100, a processor control device 200, and a processor 300. The sensor 100 may be configured to collect environmental information, and send the environmental information as sensor data to the processor control device 200. After the processor control device 200 processes the received sensor data, the processor control device 200 may output a control signal for controlling the processor 300, and control the processor 300 to turn on or turn off according to the control signal.

The environmental information may include at least one type of information that represents the environment where the sensor is in, such as visual information, sound information, taste information, tactile information, and gravity sensing information.

Alternatively, the sensor 100 may be a visible light sensor such as a webcam and a camera; the sensor 100 may also be an invisible light sensor, such as a millimeter wave radar, a laser radar, and infrared equipment; the sensor 100 may further be a sound sensor, such as a microphone and a sound wave receiver; and the sensor 100 may still further be another sensor for collecting environmental information.

Alternatively, the processor 300 may be a general IC (Integrated Circuit) for executing a computer instruction. It can be understood that the processor 300 may be a component that is integrated in equipment for executing a computer instruction. The control over the entire equipment can be realized by controlling the processor 300. For instance, the processor 300 can be integrated in a robot. In this way, the control over the robot can be realized by controlling the processor 300. For another instance, the processor 300 can be integrated in a smart phone. In this way, the control over the smart phone can be realized by controlling the processor 300.

Alternatively, referring to FIG. 1, the sensor 100 may send the environmental information that is collected by the sensor 100 to the processor control device 200, and may also send the collected environmental information to the processor 300.

It should be explained that the processor control device 200 and the processor 300 may be integrated in the same equipment, the processor control device 200 may also be connected to the processor via an interface, and the processor control device 200 may further be connected to the processor 300 by means of telecommunication. In other words, a manner of connection between the processor control device 200 and the processor 300 is not restricted in the present example.

In the application scenario above, the processor control device may determine whether to turn on the processor according to the obtained sensor data. The sensor may keep collecting environmental information. In other words, the processor may be turned on only when the sensor obtains particular environmental information. In a way that the processor control device controls the starting up of the processor, power consumption may be effectively reduced in the application scenario above.

Figure 2:
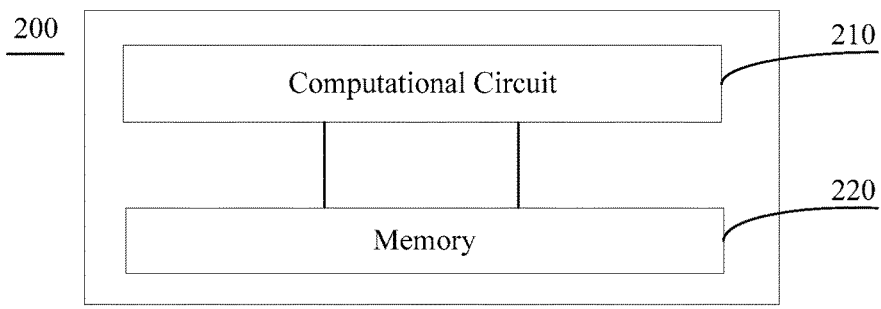
FIG. 2 is a structural diagram of a processor control device according to an example.

FIG. 2 is a structural diagram of a processor control device according to an example. The structure of the processor control device 200 of the present example may include a computational circuit 210 and a memory 220, where the computational circuit 210 may be connected to the memory 220, and data may be transferred between the computational circuit 210 and the memory 220. The computational circuit 210 may be configured to obtain a control signal according to the sensor data, where the control signal is for controlling the processor 300. The sensor data may be the environmental information obtained by the sensor 100 directly, and may also be data obtained by further processing the environmental information collected by the sensor.

Alternatively, the computational circuit 210 may be configured to perform a machine learning algorithm, where in specific, the machine learning algorithm may include, but is not limited to, a neural network algorithm, a decision tree, and a support vector machine.

Alternatively, the obtained control signal may be a simple on/off signal for controlling the processor to turn on or turn off, and may also be a complex digital signal for realizing complex control over the processor. For instance, different numbers in a digital signal may correspond to different control instructions as configured in a preset control protocol, and the control over the processor can be realized according to different control instructions. The control signal may also be a control signal of another type, including a speech signal and an image signal. In other words, the type of the control signal is not restricted in the present example.

It should be noted that the computational circuit 210 and the memory 220 can both be realized by hardware. Alternatively, the computational circuit 210 may be a circuit including a digital circuit and an analog circuit. The computational circuit 210 may be realized by using a dedicated IC that is formed by a circuit component, where the circuit component may be a basic component or a combination of basic components including CMOS (Complementary Metal-oxide-semiconductor), a diode, a triode, and a memristor. A sensor signal may be processed by these basic components or a combination of these basic components to obtain a control signal.

Alternatively, the computational circuit 210 may also be a general IC, alternatively, the general IC may be at least one of CPU (Central Processing Unit), GPU (Graphics Processing Unit), FPGA (Field-Programmable Gate Array), NPU (Neural-Network Processing Unit), and DSP (Digital Signal Process). Alternatively, the computational circuit 210 may include an instruction set processor and a related chipset.

Alternatively, the memory 220 may include a nonvolatile memory and/or a volatile memory. The memory 220 may also include an on-board memory for caching. The nonvolatile memory may be at least one of ROM (Read Only Memory), PROM (Programmable ROM), EPROM (Electrically PROM), EEPROM (Electrically Erasable PROM), or flash memory. The volatile memory may be RAM (Random Access Memory) or external caching memory. By way of illustration, rather than limitation, RAM can be obtained in various forms, such as SRAM (Static RAM), DRAM (Dynamic RAM), SDRAM (Synchronous DRAM), DDRSDRAM (Double Data Rate SDRAM), ESDRAM (Enhanced SDRAM), SLDRAM (Synchlink DRAM), RDRAM (Rambus Direct RAM), DRDRAM (Direct Rambus Dynamic RAM), and RDRAM (Rambus Dynamic RAM).

Alternatively, the memory 220 may store a corresponding computer program instruction. The computational circuit 210 may process the sensor signal by calling the corresponding computer program instruction to obtain a control signal.

It can be understood that in a real application, the memory 220 and the computational circuit 210 may be arranged in the same equipment, and may also be arranged in different equipment. For instance, the memory 220 may be arranged in cloud equipment, and the computational circuit 210 may be arranged in terminal equipment.

The processor control device provided in any of the examples above can process the sensor data by the computational circuit, so as to determine whether to turn on the processor, and more accurately control the power consumption or time delay of the entire system.

Figure 3:
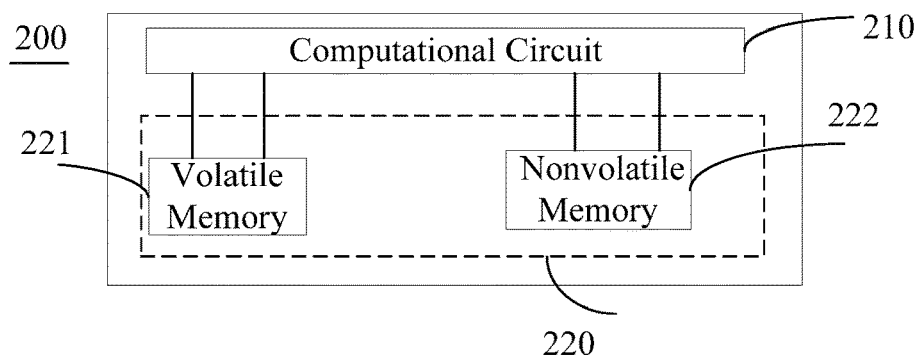
FIG. 3 is a structural diagram of a processor control device according to another example.

FIG. 3 is a structural diagram of a processor control device according to another example. In the present example, the memory 220 of the processor control device may include a plurality of memories of different types, and the memories of different types may store different objects that are to be stored respectively. The memory 220 may include a volatile memory 221 and/a nonvolatile memory 222. It can be understood that the volatile memory cannot retain data when power is interrupted, but the volatile memory is faster to read and write data. In this case, the volatile memory may be configured to cache intermediate data that are generated when the sensor signal is being processed, while the nonvolatile memory 222 may be configured to store a computational model. When the computational circuit 210 is required to call a computational model, the computational circuit may obtain a corresponding computational circuit that is stored in the nonvolatile memory 222. When the computational circuit 210 performs computations, intermediate data generated during the process may be cached in the volatile memory 221.

The processor control device provided by the example above may store the intermediate data and the computational model separately. By storing the intermediate data in the volatile memory and the computational model in the nonvolatile memory, computation speed may be improved.

Figure 4:
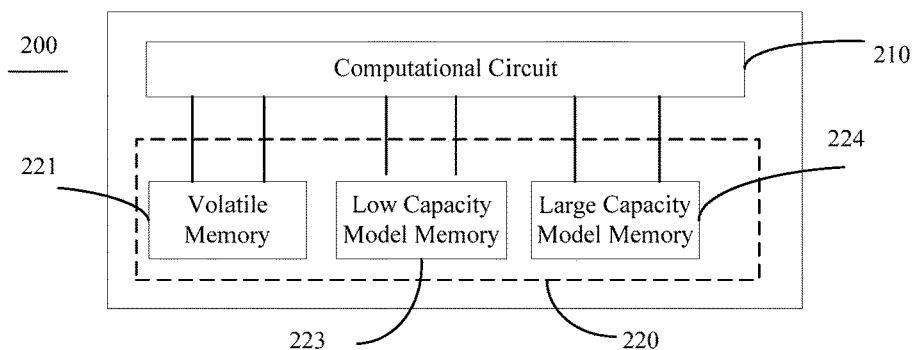
FIG. 4 is a structural diagram of a processor control device according to yet another example.

FIG. 4 is a structural diagram of a processor control device according to yet another example. The present example shows another combination of the memory in the processor control device. Alternatively, based on the example as shown in FIG. 3, the nonvolatile memory 222 that may be configured to store the computational model can be further divided into a low capacity model memory 223 and a large capacity model memory 224, where the low capacity model memory 223 can store the first computational model, and the large capacity model memory 224 can store the second computational model. The capacity of the first computational model may be less than that of the second computational model. It should be explained that the capacity refers to the memory overhead of a computational model. It can be understood that the "large capacity" and the "low capacity" can be determined according to a medium of the memory or based on actual needs.

Furthermore, the capacity of memory refers to the amount of data that a memory can hold, which is an indicator for measuring the maximum amount of data that a memory can store. The large capacity model memory 224 and the low capacity model memory 223 can both be nonvolatile memories. Furthermore, the large capacity model memory 224 can be a nonvolatile memory with large memory capacity, and the low capacity model memory 223 can be a nonvolatile memory with low memory capacity. It can be understood that the non-volatile memory with larger memory capacity has a slower access speed and higher power consumption.

It should be explained that the low capacity model memory 223 has less memory capacity and consequently consumes less energy. However, when processing a sensor signal, the accuracy of the low capacity model memory 223 is relatively low, thus the first computational model may not be suitable for processing complex sensor data. The second computational model is suitable for processing complex sensor data, but the second computational model requires larger memory capacity. In this case, the large capacity model memory 224 consumes more energy. Specifically, a threshold may be set. When required memory capacity is less than the threshold, the computational circuit 210 may only need to exchange data with the low capacity model memory 223, and when required memory capacity is greater than the threshold, the computational circuit 210 may then exchange data with the large capacity model memory 224. Furthermore, in a real application, the threshold can be preset according to a threshold of hardware or according to the prior knowledge, or the threshold can be obtained by computing parameters input by users. It should be explained that a low capacity computational model can be distinguished from a large computational model according to the threshold, or according to different value ranges.

The processor control device provided by the example may store the low capacity computational model and the large computational model separately. The device may exchange data with the low capacity model memory when only the low capacity computational model needs to be called, and exchange data with the large capacity model memory when the large capacity computational model needs to be called, which may improve the computation speed and reduce power consumption.

It should be explained that in addition to the combination shown in FIG. 3 or FIG. 4, the memory in the processor control device can also be implemented by means of another combination. For instance, the memory may only include a volatile memory, or may only include a nonvolatile memory.

Figure 5:
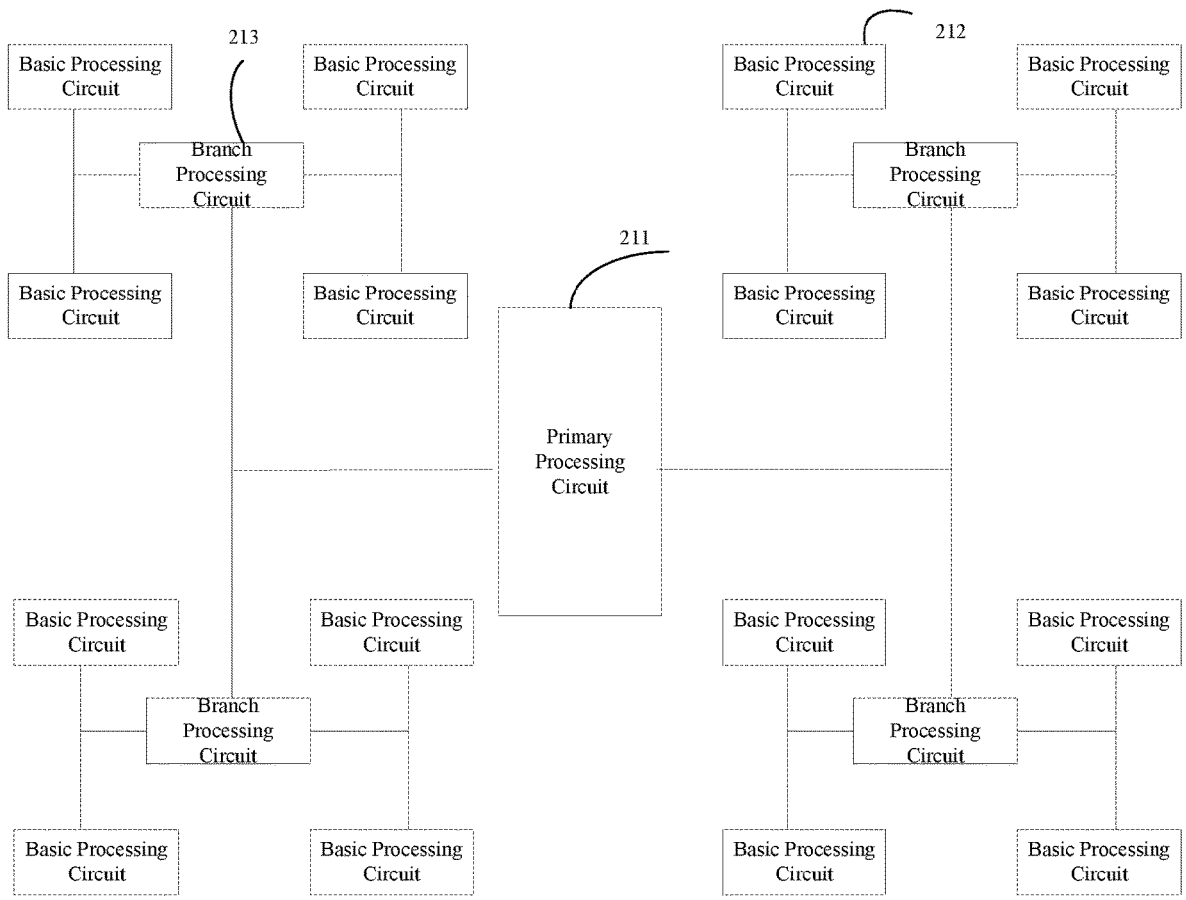
FIG. 5 is a structural diagram of a computational circuit according to an example.

Referring to FIG. 5, the example shows a specific structure of the computational circuit 210 in the processor control device according to FIG. 3 or FIG. 4. As shown in FIG. 5, the computational circuit 210 may include a primary processing circuit 211, a basic processing circuit 212, and a branch processing circuit 213.

Specifically, the primary processing circuit 211 may be connected to the branch processing circuit 213, and the branch processing circuit 213 may be connected to at least one basic processing circuit 212. The branch processing circuit 213 may be configured to receive and send data of the primary processing circuit 211 or the basic processing circuit 213.

Figure 6:
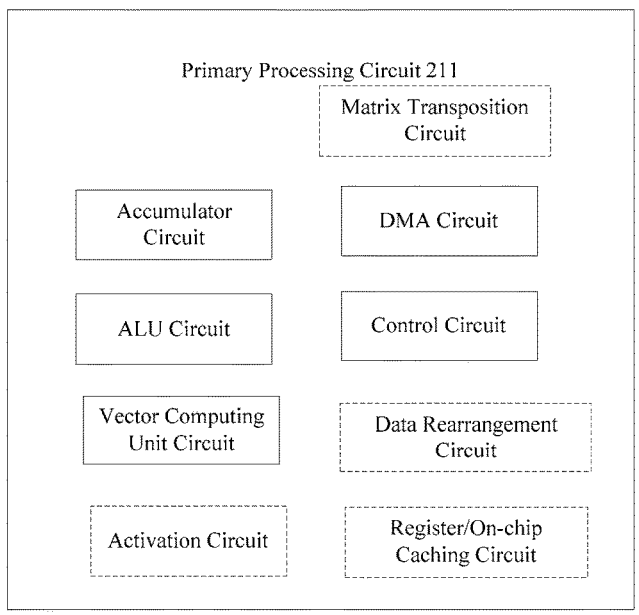
FIG. 6 is a structural diagram of a primary processing circuit in a computational circuit according to an example.

Referring to FIG. 6, FIG. 6 is a structural diagram of a primary processing circuit in a computational circuit 210 according to another example. Based on the processor control device provided in FIG. 5, the present example provides an implementation of the primary processing circuit 211. The primary processing circuit 211 may include a control circuit, a vector computing unit circuit, an ALU (Arithmetic and Logic Unit) circuit, an accumulator circuit, a direct memory access circuit, and the like. It can be understood that in a real application, according to different functions to be realized, the primary processing circuit 211 may further include a conversion circuit such as a matrix transposition circuit, a data rearrangement circuit or an activation circuit, a register and/or an on-chip caching circuit, and the like.

The primary processing circuit 211 may further include a data sending circuit, a data receiving circuit, or an interface. Furthermore, a data distribution circuit and a data broadcasting circuit may be integrated in the data sending circuit. It can be understood that in a real application, the data distribution circuit and the data broadcasting circuit may also be arranged separately. The data sending circuit and the data receiving circuit may also be integrated together as a data receiving and sending circuit.

In the processor control device 200, the computational circuit may be configured to broadcast data, and may also be configured to distribute data. Data for broadcasting refers to the data that need to be sent to each basic processing circuit. Data for distributing refers to the data that need to be selectively sent to some basic processing circuits. The selection may be performed in a way that is determined by the primary processing circuit 211 according to the load and the manner of computation. The method of broadcasting refers to sending the data for broadcasting to each basic processing circuit 212 in the form of broadcasting. It should be explained that in a real application, the data for broadcasting may be sent to each basic processing circuit 212 by broadcasting once, or by broadcasting for a plurality of times. The times of broadcasting are not restricted in the example of the present disclosure. The method of distributing refers to selectively sending, by the primary processing circuit 211, the data for distributing to each basic processing circuit 212.

When distributing data, the control circuit of the primary processing circuit may send data to some or all of the basic processing circuits 212. It should be explained that the data may be identical or different. Specifically, if data are sent by means of distribution, the data received by each basic processing circuit 212 may be different, alternatively, and some of the basic processing circuits may receive the same data.

Specifically, when broadcasting data, the control circuit of the primary processing circuit may send data to some or all of the basic processing circuits, and each basic processing circuit may receive the same data. In other words, the data for broadcasting may include the data that need to be received by all of the basic processing circuits 212. The data for distributing may include the data required to be received by some basic processing circuits 212. The primary processing circuit 211 may send the data for broadcasting to all branch processing circuits 213 by broadcasting once or by broadcasting for a plurality of times. The branch processing circuits 213 may then forward the data for broadcasting to all basic processing circuits 212.

Alternatively, the vector computing unit circuit of the primary processing circuit may be configured to perform a vector computation which may include but not be limited to: addition, subtraction, multiplication, and division between two vectors; addition, subtraction, multiplication, and division between a vector and a constant; or any computation performed on each element in a vector. Continuous computations may be addition, subtraction, multiplication, division, an activation computation, an accumulation computation, and the like, between a vector and a constant.

Figure 7:
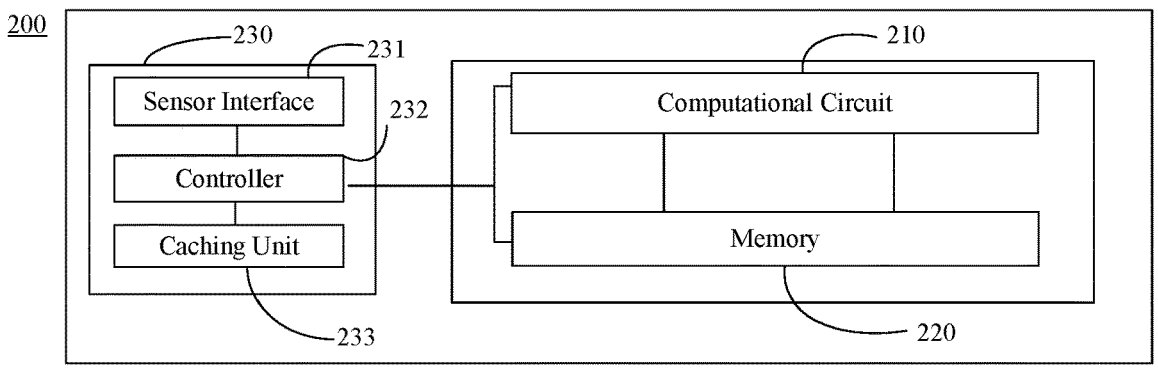
FIG. 7 is a structural diagram of a processor control device according to another example.

FIG. 7 is a structural diagram of a processor control device according to an example. The processor control device may include a computational circuit 210, a memory 220, and a sensor control unit 230. The processor control device of the present example may further include the sensor control unit configured to control the sensor signal. The processor control device 200 may further include the sensor control unit 230 in addition to the computational circuit 210 and the memory 220. The sensor control unit 230 may be configured to control the sensor signal.

Alternatively, the sensor control unit 230 may include one or more sensor interfaces 231 configured to adapt to sensors of different types and models according to different access protocols. It can be understood that sensors of different types and models may have buses of different types. In this case, using one or more sensor interfaces to adapt to sensors of different types and models may improve the universality of the processor control device.

Alternatively, the sensor control unit 230 may include a controller 232 and a caching unit (cache, buffer, or scratch pad) 233, where the controller 232 and the caching unit 233 may be communicatively connected. The controller 232 may control the sensor according to the access protocol of the sensor, and perform simple logic operation according to an input sensor signal. The caching unit 233 may be configured to cache a sensor signal sent by the sensor. It can be understood that the controller 232 and the caching unit 233 can both be realized by hardware. For instance, the controller 232 may be implemented by means of IC such as CPU as mentioned in the examples above. With the controller 232 and the caching unit 233, the control unit of the sensor can perform a simple determination on the sensor signal. For instance, for a video signal, the controller 232 may determine whether there is a change between a previous and a subsequent frames. The sensor signal may be further filtered through the simple determination, and only an important sensor signal may be sent to the computational circuit 210 and the memory 220, which may further reduce the system overhead and energy consumption.

Alternatively, the sensor control unit 230 may include a configuration memory configured to store interactive information input by users. Users may select interactive information to input according to their preferences and application scenarios. The configuration memory may store the interactive information, perform computation according to the interactive information to obtain configuration information, and configure the device according to the configuration information.

Figure 8:
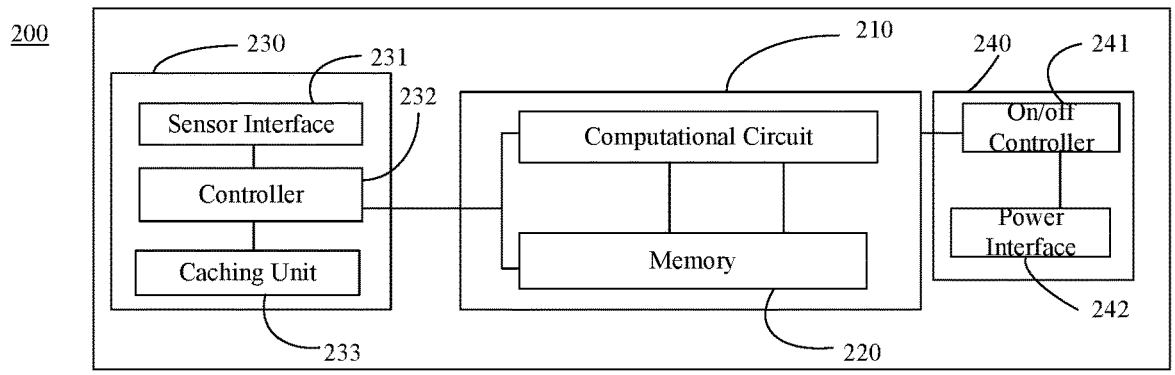
FIG. 8 is a structural diagram of a processor control device according to yet another example.

FIG. 8 is a structural diagram of a processor control device according to an example. The processor control device may include a computational circuit 210, a memory 220, a sensor control unit 230, and a power controller 240. In the present example, the control signal may be an on/off signal. The processor control device may further include the power controller 240 configured to convert the on/off signal into an action of turning on/off the power of processor, so as to control the processor to turn on or turn off. In other words, when the control signal is a turning on signal, the power controller may turn on the power that provides electricity to the processor so that the processor can be turned on, and when the control signal is a turning off signal, the power controller may turn off the power that provides electricity to the processor so that the processor can be turned off.

Specifically, the power controller 240 may include an on/off controller 241 and a power interface 242, where the on/off controller may be configured to control the on/off of the power according to the on/off signal, and the power interface 242 may be configured to control the on/off of the power that provides electricity to the processor.

In an example, the control signal generated by the processor control device may be a power saving signal which may include at least one of a frequency reduction signal, a voltage reduction signal, a shutdown signal for some units, and a clock shutdown signal for some units.

Specifically, the frequency reduction signal is for controlling the processor to perform frequency reduction operation. The voltage reduction signal is for controlling the processor to perform voltage reduction operation. The shutdown signal for some units is for shutting down some units of the processor. A processor usually has a plurality of units, such as a control unit, a computation unit, and a storage unit, where the computation unit may include a plurality of computation cores. Shutting down some units or some computation cores of a processor may reduce the power consumption per unit time of the processor, so that the battery life may be improved.

An example of the present disclosure provides a chip including the processor control device of any of examples above.

Specifically, a chip may refer to a carrier of an integrated circuit. After an integrated circuit goes through a process of designing, manufacturing, packaging, and testing, a chip may be obtained. A chip is usually a stand-alone carrier that is ready for use. Each of the units and circuits of the processor control device may be integrated in the chip provided in the present example, which can save physical space and further reduce energy consumption.

An example of the present disclosure provides a chip package structure including the chip.

Specifically, the chip package structure refers to enclosing the chip in the structure. The chip is fixed on a board card by means of a casing of the chip package, which can realize the purposes of placing, fixing, sealing, and protecting the chip as well as enhancing electrothermal performance. The contacts on the chip can also be wired to the pins of the package casing, and these pins can be connected to other devices through the wires on the board card.

Furthermore, the sensor control unit 230 in the processor control device may be enclosed by means of stacking in the chip package structure together with the computational circuit 210 and the memory 220.

The chip package structure can shorten the physical distance between the computational circuit 210, the memory 220, and the sensor control unit 230, which may further reduce the energy consumption.

It should be explained that the sensor control unit 230, the computational circuit 210, and the memory 220 may be enclosed in the chip package structure, and may also be enclosed in different chip package structures separately, and may further be set in different devices.

An example of the present disclosure provides a board card including the chip package.

Specifically, a board card is a printed circuit board. It is manufactured with a ferrule that can insert into a slot for connecting to an external device.

An example of the present disclosure provides an electronic device including the board.

Specifically, the electronic device may include one or a combination of a robot, a computer, a printer, a scanner, a tablet, a smart terminal, a mobile phone, a traffic recorder, a navigator, a webcam, a cloud server, a camera, a video camera, a projector, a watch, a headphone, a mobile storage, a wearable device, a vehicle, a household appliance, and/or medical equipment. The vehicle may include at least one of an airplane, a ship, and a car. The household appliance may include at least one of a television, an air conditioner, a microwave oven, a refrigerator, a rice cooker, a humidifier, a washing machine, an electric lamp, a gas stove, and a range hood. The medical equipment may include at least one of a nuclear magnetic resonance spectrometer, a B-ultrasonic scanner, and an electrocardiograph.

Figure 9:
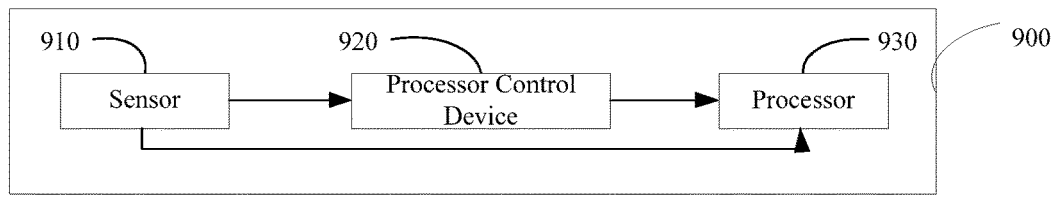
FIG. 9 is a structural diagram of electronic equipment according to an example.

Referring to FIG. 9, an example provides electronic equipment which may include a sensor, a processor, and the processor control device provided by any of the examples above. The processor control device may be connected to the processor. The power consumption per unit time of the processor control device may be less than that of the processor. Specifically, electronic equipment 900 may include a sensor 910, a processor control device 920, and a processor 930. The processor control device 920 may be connected to the processor 930, and the sensor 910 may be connected to the processor 930 and the processor control device 920. The sensor 910 may be configured to collect environmental information, and send the environmental information as sensor data to the processor control device 920.

The sensor 910 may be one or a combination of a webcam, a camera, a millimeter wave radar, infrared equipment, a microphone, a sound wave receiver, and a laser radar. The environmental information collected by the sensor may be at least one or a combination of information representing the environment where the sensor is in, such as visual information, sound information, taste information, tactile information, and gravity sensing information.

The processor 930 may be a main processor of the electronic equipment, where the main processor may be configured to control the entire electronic equipment and may consume much energy. The processor control device 920 may be a co-processor that may be configured to receive and process the sensor data collected by the sensor, then output a control signal for controlling the processor 300, and control the processor 300 according to the control signal. It can be understood that the energy consumption per unit time of the processor control device 920 should be less than that of the processor 930.

It should be explained that in the electronic equipment shown in the present example, the sensor 910 may be connected to the processor control device 920 and the processor 930 respectively. In other words, the sensor data of the sensor 910 may be sent to the processor control device 920, and may also be sent to the processor 930 directly. In other examples, the sensor 910 may be connected to the processor control device 920 only. In other words, the sensor data may only be sent to the processor control device.

The electronic equipment above may control the processor according to the obtained sensor data. The control may include turning off the processor, reducing the frequency or voltage, or shutting down some units. In this process, the sensor may keep collecting environmental information, and the processor control device may also keep responding to the environmental information sent by the sensor. Therefore, in the way that the processor control device controls the processor, the power consumption may be effectively reduced in the application scenario above. In addition, since the sensor keeps collecting environmental information and the processor control device also keeps generating control signals according to the environmental information collected by the sensor, the electronic device can also respond to environmental information in time.

For the method of any of the examples provided by the present disclosure, a subject that performs the method may be the processor control device of any of the examples. The device may be implemented by means of software, hardware, or a combination of software and hardware. The device may exist independently, or may be integrated in equipment, which for example, the device can be integrated in a home robot. For convenience of description, in the method of any of the examples provided by the present disclosure, unless otherwise specified, the subject that performs the method is a processor control device implemented by means of hardware.

Figure 10:
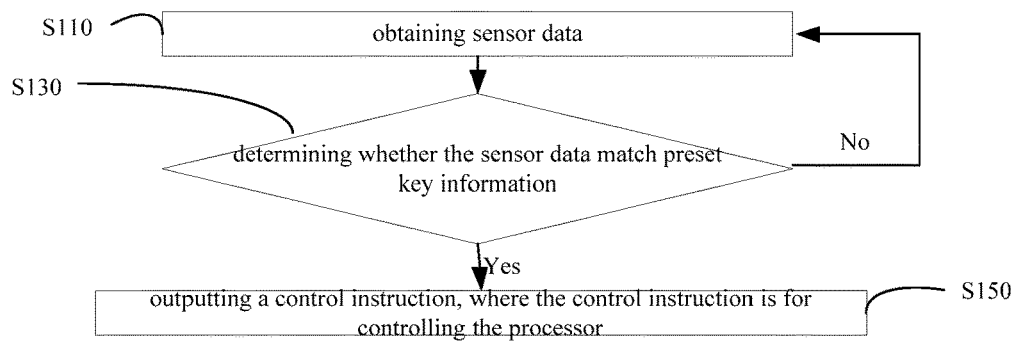
FIG. 10 is a flow chart of a processor control method according to an example.

FIG. 10 is a flow chart of a processor control method according to an example. The method may include:

S110, obtaining sensor data.

Specifically, the processor control device may first obtain sensor data, where the sensor data may be environmental information collected by the sensor, and may also be data obtained by further processing the environmental information collected by the sensor.

The method may include: S130, determining whether the sensor data match preset key information.

Specifically, the processor control device may determine whether the sensor data match preset key information. The preset key information may be the information obtained by the processor control device before the processor control device performs determination of this time, may be the information input by users according to specific needs, and may further be the information obtained by computation which is performed by processor control device before the processor control device performs determination of this time. For instance, the preset key information may be the image information of a specific object, may be specific speech information, and may further be specific radar scanning information. In other words, the type of the preset key information is not restricted in the present example.

Furthermore, the processor control device can understand the sensor data through CNN (Convolutional Neural Network), and then determine whether the sensor data match the preset key information.

The method may include: S150, if the sensor data match the preset key information, outputting a control instruction, where the control instruction is for controlling the processor.

Specifically, if the sensor data do not match the preset key information, a control instruction may be output, where the control instruction may be a digital signal, and may also be an analog signal. The control instruction may further be a complex digital signal, where complex control can be performed on the main processor according to the digital signal. For instance, a control instruction to be output may be a two-digit binary digital signal, and different numbers may correspond to different control instructions as configured in a preset control protocol, and the control over the processor can be realized according to different control instructions. It can be understood that the control instruction may also be a control instruction of another type. For instance, the control instruction may include a speech signal and an image signal. In other words, the type of the control instruction is not restricted in the present example.

Alternatively, the control instruction may include a turning on instruction for causing the processor to start to work. In other words, when the processor is off, if the processor control device outputs a turning on instruction, the processor may start to work.

Alternatively, the control instruction may include at least one of a frequency reduction instruction, a voltage reduction instruction, and a shutdown instruction for some units. The frequency reduction instruction is for controlling the processor to perform frequency reduction operation. The voltage reduction instruction is for controlling the processor to perform voltage reduction operation. The shutdown instruction for some units is for shutting down some units of the processor. A processor usually has a plurality of units, such as a control unit, a computation unit, and a storage unit, where the computation unit may include a plurality of computation cores.

Shutting down some units or some computation cores of a processor may reduce the power consumption per unit time of the processor, so that the battery life may be increased.

The processor control method provided by the present example can determine whether to turn on the processor, or whether to reduce the energy consumption when the processor is in operation according to the preset key information. In other words, the processor is turned on and in operation only when the sensor data match the preset key information. Or, when the processor is in operation, the energy consumption of the processor can be reduced by decreasing frequency, decreasing voltage, or turning off some units. In this case, the processor control method of the present example may reduce energy consumption and improve battery life.

Still referring to FIG. 10, in an example, if the sensor data do not match the preset key information, the step S110 which is obtaining sensor data may continue to be performed.

Specifically, when the processor control device determines the sensor data do not match the preset key information, the device may continue to obtain the sensor data. In other words, the sensor data may keep being input into the processor control device, and the processor control device may continue to determine whether new sensor data match preset key information.

Regarding the processor control method provided by the present example, when the sensor data do not match the preset key information, the step of obtaining sensor data may be continued. In addition to reducing overhead and energy consumption, the method can enable the processor control device to have more accurate control over the processor without losing the data obtained by the sensor.

Figure 11:
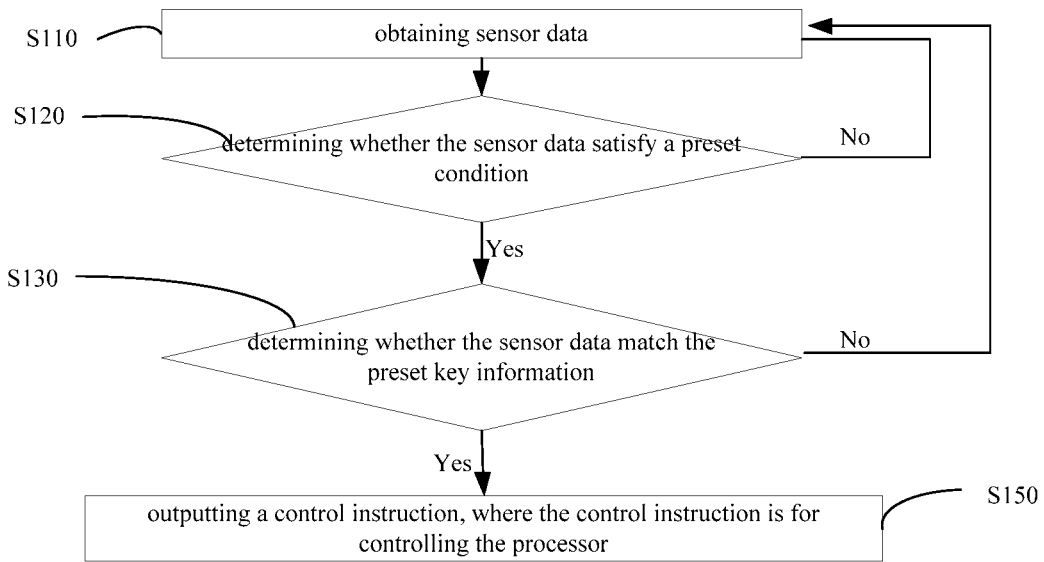
FIG. 11 is a flow chart of a processor control method according to an example.

FIG. 11 is a flow chart of a processor control method according to an example. Prior to the step S130: determining whether the sensor data match the preset key information, the method may further include:

S120, determining whether the sensor data satisfy a preset condition, if the sensor data satisfy the preset condition, continuing the step S130 which is determining whether the sensor data match the preset key information.

Specifically, the preset condition may include but not be limited to: a preset time interval, the sensor data of a current time being different than the sensor data of a previous time, and the like. It can be understood that a different preset condition may be used according to different demands.

Specifically, if the sensor data satisfy the preset condition, the step of determining whether the sensor data match the preset key information may be performed.

Alternatively, the preset condition may be a preset time interval. For instance, a preset time interval is 5 seconds. After every 5 seconds, the step of determining whether the sensor data match the preset key information may be performed.

Alternatively, the preset condition may be whether the sensor data of a current time being the same as the sensor data of a previous time, and if the same, a determination of whether the sensor data match the preset key information may be performed. Furthermore, when the sensor data is video data, the sensor data of a current time is a current frame of a video stream, and the sensor data of a previous time is a previous frame of the video stream. If the current frame is the same as the previous frame, a determination of whether the sensor data match the preset key information may be performed.

The processor control method provided by the example above may first screen out the sensor data that do not satisfy the preset condition before performing the step of determining whether the sensor data match the preset key information. In other words, only the sensor data that satisfy the preset condition are to be matching with the preset key information. In this way, computing overhead may further be reduced, and energy consumption may decrease.

In an example, if the sensor data do not satisfy the preset condition, the step of obtaining sensor data may continue to be performed.

In an example, if the sensor data do not satisfy the preset condition, the processor control device may continue to perform the step S110, which is obtaining sensor data. Then it is determined whether new sensor data match the preset key information according to the new sensor data.

Regarding the processor control method provide by the present example, when the sensor data do not satisfy the preset condition, the step of obtaining sensor data may continue being performed. In addition to reducing overhead and energy consumption, the method can enable the processor control device to have more accurate control over the processor without losing the data obtained by the sensor.

Figure 12:
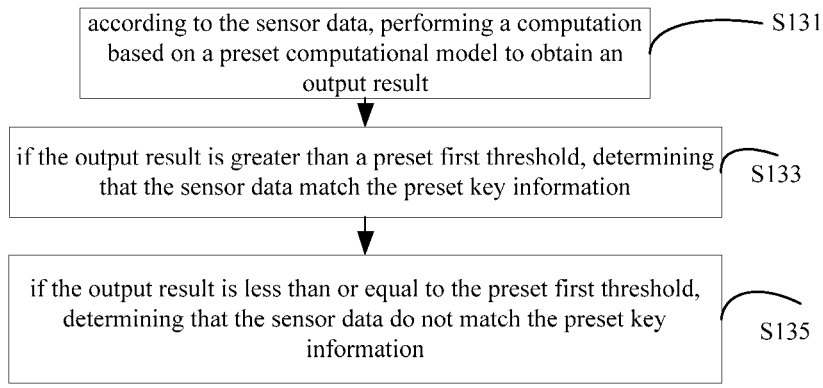
FIG. 12 is a flow chart of a step of determining whether sensor data match preset key information according to an example.

Regarding a specific manner for implementing the step of determining whether the sensor data match the preset key information in the present example, whether the sensor data match the preset key information may be determined according to the similarity between the sensor data and the preset key information, where the similarity may be obtained by computation. The determination may also be realized in a way that the sensor data are used as input into a neural network system for computation by using a preset neural network operation model, an output result is then obtained, and whether the sensor data match the preset key information is determined according to the output result. Alternatively, the step may further be realized by a manner shown in FIG. 12. FIG. 12 is a flow chart of part of a processor control method according to an example. Based on the example shown in FIG. 10 or 11, the step S130, which is determining whether the sensor data match the preset key information, may include:

S131, according to the sensor data, performing a computation based on a preset computational model to obtain an output result.

Specifically, according to the sensor data obtained in the step S110, a computation may be performed based on the preset computational model to obtain an output result. Furthermore, the computational model may be a model obtained from training by a machine learning algorithm. In other words, the model may be obtained from training by a supervised machine learning algorithm, and may also be obtained from training by an unsupervised machine learning algorithm.

Alternatively, a neural network may be used for training the computational model. In other words, a training sample may be used as input into the neural network to obtain an output result; the output result may be compared with an expected value; and a weight of the neural network may be adjusted through a gradient descent algorithm until the output result meets the expected value. The computational model obtained from neural network training may be faster and more accurate when processing a complex sensor signal. Furthermore, the training sample may be obtained according to prior knowledge, and may be generated according to another neural network.

Furthermore, the computational model may be divided into a low capacity computational model and a large capacity computational model. The low capacity computational model requires less computing overhead. However, when processing a sensor signal, the accuracy of the low capacity computational model is relatively low, thus it may not be suitable for processing a complex sensor signal. The large capacity computational model is suitable for processing complex sensor data, but it requires more computing overhead.

The step may further include: S133, if the output result is greater than a preset first threshold, determining that the sensor data match the preset key information.

Specifically, the first threshold may be set by users according to particular needs, and may also be set according to the threshold of hardware. Further, users may input a parameter that describes sensitivity. The processor control device may obtain the first threshold by computing according to the parameter. For instance, in a real application, since an output result is often a value in the value range of [0,1], if users need a relatively high sensitivity, they may set a relatively low threshold correspondingly, such as 0.3. If users need a relatively low sensitivity, they may set a relatively high threshold correspondingly, such as 0.7. It can be understood that the greater the first threshold is, the less likely that the sensor data match the preset key information, and the less likely that the processor would be turned on. In contrast, the lower the first threshold is, the more likely that the sensor data match the preset key information, and the more likely that the processor would be turned on.

The step may further include: S135, if the output result is less than or equal to the preset first threshold, determining that the sensor data do not match the preset key information.

Specifically, if the output result is not greater than the preset first threshold, it may be determined that the sensor data do not match the preset key information.

By determining whether the sensor data match the preset key information, the processor control method provided by the example above may have higher accuracy and stronger flexibility. By combining a special-purpose neural network processor, the method may have much lower energy consumption. In this way, the computing overhead may further be reduced, and energy consumption may decrease.

Figure 13:
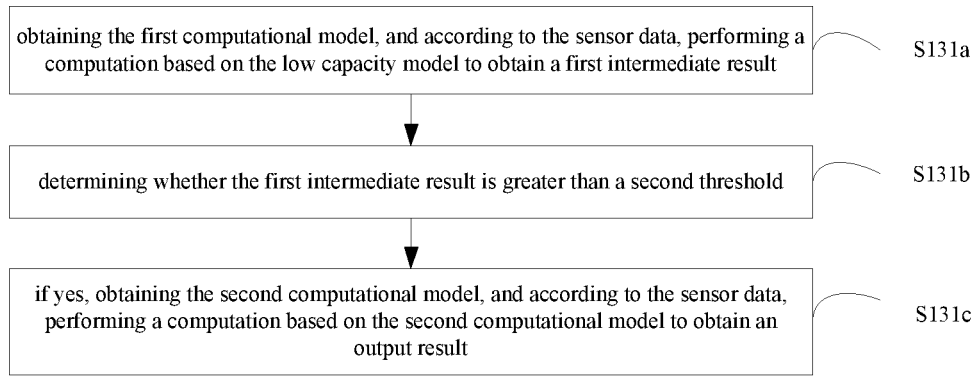
FIG. 13 is a flow chart of part of a processor control method according to an example.

FIG. 13 is a flow chart of a processor control method according to an example. The computational model may include a first computational model and a second computational model, where the capacity of the first computational model may be greater than that of the second computational model. Based on the processor control method as shown in FIG. 12, the step S131, which is according to the sensor data, performing a computation based on the preset computational model to obtain an output result, may include:

S131a, obtaining the first computational model, and according to the sensor data, performing a computation based on the low capacity computational model to obtain a first intermediate result.

Specifically, since the first computational model has less computing overhead, according to the obtained environmental information, a computation may further be performed based on the first computational model to obtain a first intermediate result. The sensor data may be used as input into the low capacity model, and the first intermediate result may be obtained by computation.

The step may include: S131b, determining whether the first intermediate result is greater than a second threshold.

The step may include: S131c, if the first intermediate result is greater than the second threshold, obtaining the second computational model, and according to the sensor data, performing a computation based on the second computational model to obtain an output result.

Specifically, if the first intermediate result is greater than the second threshold, the second computational model may then be used. Similarly, the sensor data may be used as input into the second computational model. The output result can be obtained by computation.

The processor control method provided by the example above may further divide the computational model into the first computational model and the second computational model. Regarding the sensor data, the method may first use the low capacity model that has less computing overhead. In this way, the computing overhead may further be reduced, and energy consumption may decrease.

In an example, if the first intermediate result is not greater than the second threshold, the processor control method may include:

if the first intermediate result is not greater than the second threshold, performing the step S110, which is obtaining sensor data.

Specifically, if the first intermediate result is not greater than the second threshold, new sensor data may continue to be obtained, and it may be determined whether the processor needs to be turned on according to the new sensor data.

It should be explained that though respective steps in the flowcharts FIGS. 10-13 are shown following the direction of arrows, yet these steps may not necessarily be performed by following the order indicated by the arrows. Unless clearly stated herein, the order for performing these steps is not strictly restricted. These steps may be performed in a different order. Additionally, at least part of the steps shown in FIGS. 10-13 may include a plurality of sub-steps or a plurality of phases. These sub-steps or phases may not necessarily be performed and completed at the same time, instead, these sub-steps or phases may be performed at different time. These sub-steps or phases may not necessarily be performed sequentially either, instead, these sub-steps or phases may be performed in turn or alternately with at least part of other steps, or sub-steps of other steps, or phases.

An example of the present disclosure provides a processor control module, where the control module may include:

a data obtaining unit configured to obtain sensor data;

an information matching unit configured to determine whether the sensor data match preset key information; and a control instruction outputting unit configured to output a control instruction, where the control instruction is for controlling the processor.

Specifically, the specification and technical effects of the processor control module can be seen in the specification and technical effects of the processor control method, and are thus omitted.

An example provides a chip system, where the system may include a memory, a computational circuit, and a computer program that is stored in the memory. When the computational circuit executes the computer program, the computational circuit may realize the steps of the method provided by the examples above.

Specifically, the specification and technical effects of the chip system can be seen in the specification and technical effects of the processor control method, and are thus omitted.

The examples above may be implemented entirely or partly by means of software, hardware, firmware, or any combination thereof. When the examples above are implemented by means of a software program, they may be implemented entirely or partly by means of a computer program product, where the computer program product may include one or more computer instructions. When a computer loads and executes the computer instructions, the computer may entirely or partly follow the steps or functions described in the examples of the present disclosure. The computer may be a general-purpose computer, a special-purpose computer, a computer network, or another programmable device. The computer instructions may be stored in a computer readable storage medium, or may be transferred from one computer readable storage medium to another computer readable storage medium. For instance, the computer instructions may be transferred from a website, a computer, a server, or a data center to another website, computer, server, or data center via a wired manner (e.g., coaxial cable, optical fiber digital subscriber line) or a wireless manner (e.g., infrared ray, wireless, microwave). The computer readable storage medium may be any available medium that a computer can access, or may be data storage equipment that integrates one or more available media, including a server, a data center, and data storage equipment The above-mentioned medium may be a magnetic medium such as a floppy disk, a hard disk, a magnetic tape, an optical medium (e.g., DVD), or a semiconductor medium (e.g., solid state drive).

Those skilled in the art should understand that the examples of the present disclosure can provide a computer program product for computer equipment or a readable storage medium. Therefore, the present disclosure may be implemented wholly in a form of hardware, or wholly in a form of software, or in a form of combining software and hardware. In addition, the present disclosure may be realized in a form that a computer program product is implemented by using one or more computer usable storage media (including but not limited to a disk storage, CD-ROM, an optical storage) that store computer usable program codes.

The present disclosure is described according to the flowcharts and/or the block diagrams of the method, the equipment (system), and the flowchart of the present disclosure. It should be understood that each step and/or block of the flowcharts and/or the block diagrams, and a combination of a step and/or block of the flowcharts and/or the block diagrams can be realized by a computer program instruction. The computer program instructions may be provided to the processor of a general-purpose computer, a special-purpose computer, an embedded computer, or another programmable data processing device for forming a machine, so that the processor of a computer or another programmable data processing device may execute the instructions to generate a device for realizing a specified function of a step or a plurality of steps in the flowcharts and/or one or more blocks in the block diagrams.

The computer program instructions can also be stored in a computer readable memory that can direct a computer or another programmable data processing device to work in a particular manner, so that the instructions stored in the computer readable memory can produce a product including an instruction device. The instruction device may implement the functions specified in one or more steps in the flowcharts and/or one or more blocks of the block diagrams.

These computer program instructions can also be loaded onto a computer or another programmable data processing device so that a series of operational steps may be performed on the computer or another programmable device to generate computer-implemented processing. In this way, the instructions to be executed by the computer or another programmable device may provide steps of the functions specified in one or more steps in the flowcharts and/or one or more blocks of the block diagrams.

Each technical features of the examples above can be randomly combined. For a concise description, not all possible combinations of the technical features of the examples above have been described. Yet, provided that there is no contradiction, combinations of these technical features fall within the scope of the description of the present specification.

It should be understood that in the examples provided by the present disclosure, the disclosed system, equipment, and method may be implemented in other manners without departing from the scope of the present disclosure. For instance, the examples above are merely illustrative. For instance, the division of the modules or units is only a logical function division. In a real implementation, there may be another manner for division. For instance, a plurality of units or components may be combined or may be integrated in another system, or some features can be ignored or not performed. The units described as separate components may or may not be physically separated. The components shown as units may or may not be physical units. In other words, the components may be located in one place, or may be distributed to a plurality of network units. According to actual needs, some or all of the units can be selected for realizing the purposes of the examples of the present disclosure.

The examples descried above are only several implementations of the present disclosure. Although the description is relatively specific and detailed, yet it shall not be considered as limitation of the scope of the present disclosure.

It should be noted that, those of ordinary skill in the art can make various changes and improvements without departing from the spirit of the present disclosure, which shall fall within the protection scope of the present disclosure. Therefore, the protection scope of the present disclosure shall be subject to the protection scope defined by the claims.

What is claimed is:

1. A processor control device for controlling a processor, comprising a computational circuit and a memory,
    wherein the computational circuit is connected to the memory, the computational circuit is configured to output a control signal according to obtained sensor data;
    wherein the sensor data is obtained by one or more sensors configured to collect environmental information of the processor control device, wherein the environmental information includes one or more types of the following information: visual information, sound information, taste information, tactile information, or gravity sensing information;
    wherein the computational circuit is configured to invoke a computational model to process the sensor data using a machine learning algorithm to determine whether the obtained sensor data match preset key information, the preset key information being dependent on a type of the obtained sensor data and corresponding to a type of the environmental information; and
    wherein the control signal is output when the obtained sensor data matches the preset key information, and the control signal is for controlling a power consumption of the processor in accordance with the obtained sensor data.

2. The processor control device of claim 1, wherein, the memory includes a volatile memory and a nonvolatile memory, wherein the volatile memory is configured to cache data, and the nonvolatile memory is configured to store the computational model, wherein the computational model includes a first computational model and a second computational model, wherein a capacity requirement of the first computational model is less than a capacity requirement of the second computational model,
    and wherein the nonvolatile memory includes a first capacity model memory and a second capacity model memory, wherein the first capacity model memory is configured to store the second computational model, the second capacity model memory is configured to store the first computational model, and the memory capacity of the first capacity model memory is larger than the memory capacity of the second capacity model memory.

3. The processor control device of claim 1, wherein, the computational circuit includes a primary processing circuit, one or more first-level processing circuits, and one or more second-level processing circuit, wherein
    the primary processing circuit is connected to the one or more second-level processing circuits, and the one or more second-level processing circuits each is connected to one or more first-level processing circuits, wherein the primary processing circuit includes a control circuit, a vector computing unit circuit, an arithmetic and logic unit circuit, an accumulator circuit, and a direct memory access circuit;
    and wherein the computational circuit includes a neural network processing unit that is configured to perform the machine learning algorithm.

4. The processor control device of claim 1, wherein, the processor control device includes a sensor control unit, wherein the sensor control unit is connected to the computational circuit and is configured to control a signal transmission between the processor control device and a sensor,
    wherein the sensor control unit includes a controller and a caching unit, wherein the controller and the caching unit is communicatively connected, wherein the controller is configured to control the sensor, and the caching unit is configured to cache a sensor signal sent by the sensor,
    wherein the sensor control unit further includes a configuration memory that is connected to the controller, wherein the configuration memory is configured to store interactive information that is input by users.

5. The processor control device of claim 1, wherein, the control signal is an on/off signal for turning on or turning off the processor.

6. The processor control device of claim 5, wherein, the processor control device includes a power controller that is connected to the computational circuit, wherein
    the power controller is configured to turn on or turn off the processor according to the on/off signal generated by the computational circuit.

7. The processor control device of claim 6, wherein, the power controller includes an on/off controller and a power interface, wherein the on/off controller is connected between the computational circuit and the power interface in series.

8. The processor control device of claim 1, wherein, the control signal is a power saving signal which includes at least one of a frequency reduction signal, a voltage reduction signal, and a shutdown signal for one or more units.

9. A chip comprising the processor control device of claim 1.

10. Electronic equipment comprising the one or more sensors, the processor, and the processor control device of claim 1, wherein
    the processor control device is connected to the processor, and the one or more sensors are connected to the processor and/or the processor control device, wherein the power consumption per unit time of the processor control device is less than the power consumption per unit time of the processor.

11. A processor control method for controlling a processor comprising:
   obtaining sensor data, wherein the sensor data is obtained by one or more sensors configured to collect environmental information of a processor control device, wherein the environmental information includes one or more of: visual information, sound information, taste information, or gravity sensing information;
   invoke a computational model to process the sensor data using a machine learning algorithm; and
   determining whether the sensor data match preset key information, the preset key information being dependent on a type of the obtained sensor data;
   if the sensor data match the preset key information, outputting a control instruction, wherein the control instruction is for controlling a power consumption of the processor.

12. The control method of claim 11, wherein, if the sensor data do not match the preset key information, the method further includes:
   continuing to perform the step of obtaining sensor data.

13. The control method of claim 11, wherein, prior to the determining whether the sensor data match the preset key information, the method further includes:
   determining whether the sensor data satisfy a preset condition, and
   if the sensor data satisfy the preset condition, continuing the step of determining whether the sensor data match the preset key information;
   if the sensor data do not satisfy the preset condition, continuing to perform the step of obtaining sensor data.

14. The control method of claim 13, wherein, the determining whether the sensor data satisfy the preset condition includes:
   collecting the sensor data at every preset time interval;
   obtaining sensor data of a current time and caching sensor data of a previous time,
   determining whether the sensor data of the current time match the sensor data of the previous time, and
   if the sensor data of the current time is different from the sensor data of the previous time, determining the sensor data satisfy the preset condition.

15. The control method of claim 11, wherein, the determining whether the sensor data match the preset key information includes:
   according to the sensor data, performing a computation based on a preset computational model to obtain an output result,
   if the output result is greater than a preset first threshold, determining that the sensor data match the preset key information, and
   if the output result is less than or equal to the preset first threshold, determining that the sensor data do not match the preset key information.

16. The control method of claim 15, wherein the computational model is obtained through convolutional neural network training.

17. The control method of claim 15, wherein, the computational model includes a first computational model and a second computational model, wherein a capacity requirement of the first computational model is greater than a capacity requirement of the second computational model,
   the performing a computation based on the preset computational model to obtain an output result according to the sensor data includes:
   obtaining the first computational model, and according to the sensor data, performing a computation based on the first computational model to obtain a first intermediate result,
   determining whether the first intermediate result is greater than a second threshold, and
   if the first intermediate result is greater than the second threshold obtaining the second computational model, and according to the sensor data, performing a computation based on the second computational model to obtain an output result.

18. The control method of claim 17, wherein, the control method comprises:
   if the first intermediate result is not greater than the second threshold,
   performing the step of obtaining sensor data.

19. The control method of claim 11, wherein the control method includes a turning on instruction for turning on the processor.

20. The control method of claim 11, wherein, the control instruction includes a power saving instruction which includes at least one of a frequency reduction instruction, a voltage reduction instruction, and a shutdown instruction for some units.

* * * * *